(12) United States Patent
Norin et al.

(10) Patent No.: US 8,942,618 B2
(45) Date of Patent: Jan. 27, 2015

(54) METHOD AND SYSTEM FOR MOVING AND PLAYING CONTENT FROM HOME-BASED SYSTEM TO MOBILE SYSTEM

(75) Inventors: John Norin, Redondo Beach, CA (US); Scott Casavant, Germantown, MD (US); Jorge Guzman, Gaithersburg, MD (US); Sean S. Lee, Rockville, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 2489 days.

(21) Appl. No.: 11/593,711

(22) Filed: Nov. 7, 2006

(65) Prior Publication Data

US 2007/0281605 A1 Dec. 6, 2007

Related U.S. Application Data

(60) Provisional application No. 60/810,978, filed on Jun. 5, 2006, provisional application No. 60/811,045, filed on Jun. 5, 2006, provisional application No. 60/810,968, filed on Jun. 5, 2006, provisional application No. 60/810,979, filed on Jun. 5, 2006.

(51) Int. Cl.
*H04H 20/74* (2008.01)
*H04N 5/765* (2006.01)
*H04L 29/06* (2006.01)
(Continued)

(52) U.S. Cl.
CPC ............... *H04N 5/765* (2013.01); *H04L 63/10* (2013.01); *H04N 7/20* (2013.01); *H04N 21/41422* (2013.01); *H04N 21/4184* (2013.01); *H04N 21/4325* (2013.01); *H04N 21/4334* (2013.01); *H04N 21/6143* (2013.01); *H04N 5/775* (2013.01); *H04N 5/781* (2013.01); *H04N 5/907* (2013.01)
USPC ....................... 455/3.02; 455/152.1

(58) Field of Classification Search
USPC ............ 455/3.01, 3.02, 427, 557, 414.3, 411, 455/412.1, 67.14; 711/100; 379/88.13, 379/93.19; 380/200, 251; 705/5, 17, 51, 57, 705/67, 71; 713/151, 181, 190, 193
See application file for complete search history.

(56) References Cited

U.S. PATENT DOCUMENTS 6,118,976 A 9/2000 Arias et al.
6,259,891 B1 7/2001 Allen
(Continued)

FOREIGN PATENT DOCUMENTS

EP 1530339 A1 5/2005
GB 2387090 A 10/2003
(Continued)

OTHER PUBLICATIONS

Daimlerchrysler; "DaimlerChrysler IT Cruiser Telematics Concept"; Internet citation; retrieved from the internet: URL:http://java.sun.com/products/consumer-embedded/automotive/whitepapers/ITCruiser-Whitepaper.pdf; Jan. 2001; pp. 1-11; XP002271676.
(Continued)

*Primary Examiner* — Golam Sorowar

(57) ABSTRACT

A system and method for playing back digital satellite audio and video signals includes storing a file on a storage device associated with the satellite receiver 54. The file is communicated to a file playback device such as a mobile receiver 28 from the storage device. The file is played back using the mobile receiving device 28.

22 Claims, 4 Drawing Sheets

(51) Int. Cl.
*H04N 7/20* (2006.01)
*H04N 21/414* (2011.01)
*H04N 21/418* (2011.01)
*H04N 21/432* (2011.01)
*H04N 21/433* (2011.01)
*H04N 21/61* (2011.01)
H04N 5/775 (2006.01)
H04N 5/781 (2006.01)
H04N 5/907 (2006.01)

(56) References Cited

U.S. PATENT DOCUMENTS

| | | | |
|---|---|---|---|
| 6,442,385 B1 * | 8/2002 | Marko | 455/427 |
| 2003/0186647 A1 * | 10/2003 | Ikeda | 455/3.02 |
| 2003/0216120 A1 * | 11/2003 | Ceresoli et al. | 455/3.02 |
| 2004/0153767 A1 | 8/2004 | Dolgonos | |
| 2004/0223747 A1 * | 11/2004 | Otala et al. | 386/125 |
| 2005/0009466 A1 * | 1/2005 | Kamdar et al. | 455/3.02 |
| 2005/0068915 A1 | 3/2005 | Atad et al. | |
| 2005/0114689 A1 * | 5/2005 | Strom et al. | 713/193 |
| 2005/0124289 A1 * | 6/2005 | Coffin, III | 455/3.02 |
| 2005/0136975 A1 * | 6/2005 | Caspi et al. | 455/557 |
| 2005/0216941 A1 | 9/2005 | Flanagan et al. | |
| 2005/0282489 A1 * | 12/2005 | Kamdar et al. | 455/3.02 |
| 2006/0004948 A1 * | 1/2006 | Grace et al. | 711/100 |
| 2006/0075444 A1 | 4/2006 | Dillen | |
| 2006/0107295 A1 | 5/2006 | Margis et al. | |
| 2006/0128418 A1 | 6/2006 | Quelle et al. | |
| 2006/0154687 A1 * | 7/2006 | McDowell et al. | 455/522 |
| 2006/0166739 A1 | 7/2006 | Lin | |
| 2006/0194535 A1 * | 8/2006 | Houldsworth et al. | 455/3.01 |
| 2006/0240811 A1 * | 10/2006 | De Luca | 455/414.3 |
| 2006/0285508 A1 | 12/2006 | Vermola et al. | |
| 2006/0294205 A1 | 12/2006 | Aaltonen et al. | |
| 2007/0155307 A1 | 7/2007 | Ng et al. | |
| 2007/0258595 A1 * | 11/2007 | Choy | 380/278 |

FOREIGN PATENT DOCUMENTS

| | | |
|---|---|---|
| GB | 2407738 | 5/2005 |
| WO | 0143364 | 6/2001 |

OTHER PUBLICATIONS

International Search Report and Written Opinion dated May 16, 2008 in International counterpart Application No. PCT/US2007/023361 corresponding to U.S. Appl. No. 11/593,712, filed Nov. 7, 2006 by John Norin et al.

International Search Report and Written Opinion dated May 9, 2008 in International counterpart Application No. PCT/US2007/023355 corresponding to U.S. Appl. No. 11/593,710, filed Nov. 7, 2006 by John Norin et al.

David, Leonard; "Stratospheric Platform Serves as Satellite"; Jul. 24, 2002; http://www.space.com/missionlaunches/skytower_020724.html.

International Search Report and Written Opinion dated Aug. 11, 2008 in International counterpart application No. PCT/US2007/023363 corresponding to U.S. Appl. No. 11/595,394, filed Nov. 10, 2006 by Scott Casavant et al.

* cited by examiner

METHOD AND SYSTEM FOR MOVING AND PLAYING CONTENT FROM HOME-BASED SYSTEM TO MOBILE SYSTEM

RELATED APPLICATIONS

This application claims the benefit of four U.S. Provisional Applications entitled "DIRECTV2GO-ENTIRE SYSTEM," filed on Jun. 5, 2006, Ser. No. 60/810,978; "DIRECTV2GO-ENCRYPTION, LICENSE MANAGEMENT," filed on Jun. 5, 2006, Ser. No. 60/811,045; DIRECTV2GO-SEED MANAGEMENT, REGISTRATION," filed on Jun. 5, 2006, Ser. No. 60/810,968; and "DIRECTV2GO-SEPARATION OF DIRECTV CONTENT ON PORTABLE DEVICE," filed on Jun. 5, 2006, Ser. No. 60/810,979. The disclosures of the above applications are incorporated herein by reference.

TECHNICAL FIELD

The present invention relates generally to a mobile receiving device, and, more specifically, to a method and system to transfer and play files from a home-based system on a subscriber's vehicle-based system.

BACKGROUND

Satellite television has become increasingly popular due to its wide variety of programming. Entertainment in automobiles such as DVD players has also become increasingly popular. It would be desirable to provide a satellite television system for a vehicle so that the wide variety of programming may be enjoyed by the rear passengers.

Typical satellite systems include a receiving device that is used to receive satellite signals from the satellites and convert them to a usable format for playback on a television or monitor. Many of the satellite receivers include a digital video recorder (DVR) that stores programs for later viewing thereon. The program stored must be viewed by the television associated with the set top box and DVR.

In certain circumstances, it may be desirable to move content from a DVR to another receiving device such as an automotive based receiving device for playback thereon.

SUMMARY OF THE INVENTION

The present invention sets forth a method and apparatus for transferring files from one device to another device for playback. The files may be video and audio files received from a satellite broadcasting system. One feature of the invention includes storing a file on a storage device in communication with the satellite receiver, transferring the file to a portable memory device, coupling the portable memory device to a mobile playback device, transferring the file to the playback device from the portable memory device, and playing the file with the playback device.

In yet another aspect of the invention, a method comprises storing a file on a storage device in communication with the satellite receiver, transferring the file to a playback device from the storage device and playing the file with the playback device.

In yet another aspect of the invention, a system includes a fixed satellite receiver having a storage device associated therewith. The receiver stores the satellite file therein and communicates the satellite file from the storage device. A mobile satellite receiver receives the satellite file and plays the satellite file thereon.

One advantage of the invention is that previously stored material within a satellite receiver may be transferred to another device for playback.

Other advantages and features of the present invention will become apparent when viewed in light of the detailed description of the preferred embodiment when taken in conjunction with the attached drawings and appended claims.

DETAILED DESCRIPTION

Figure 1:
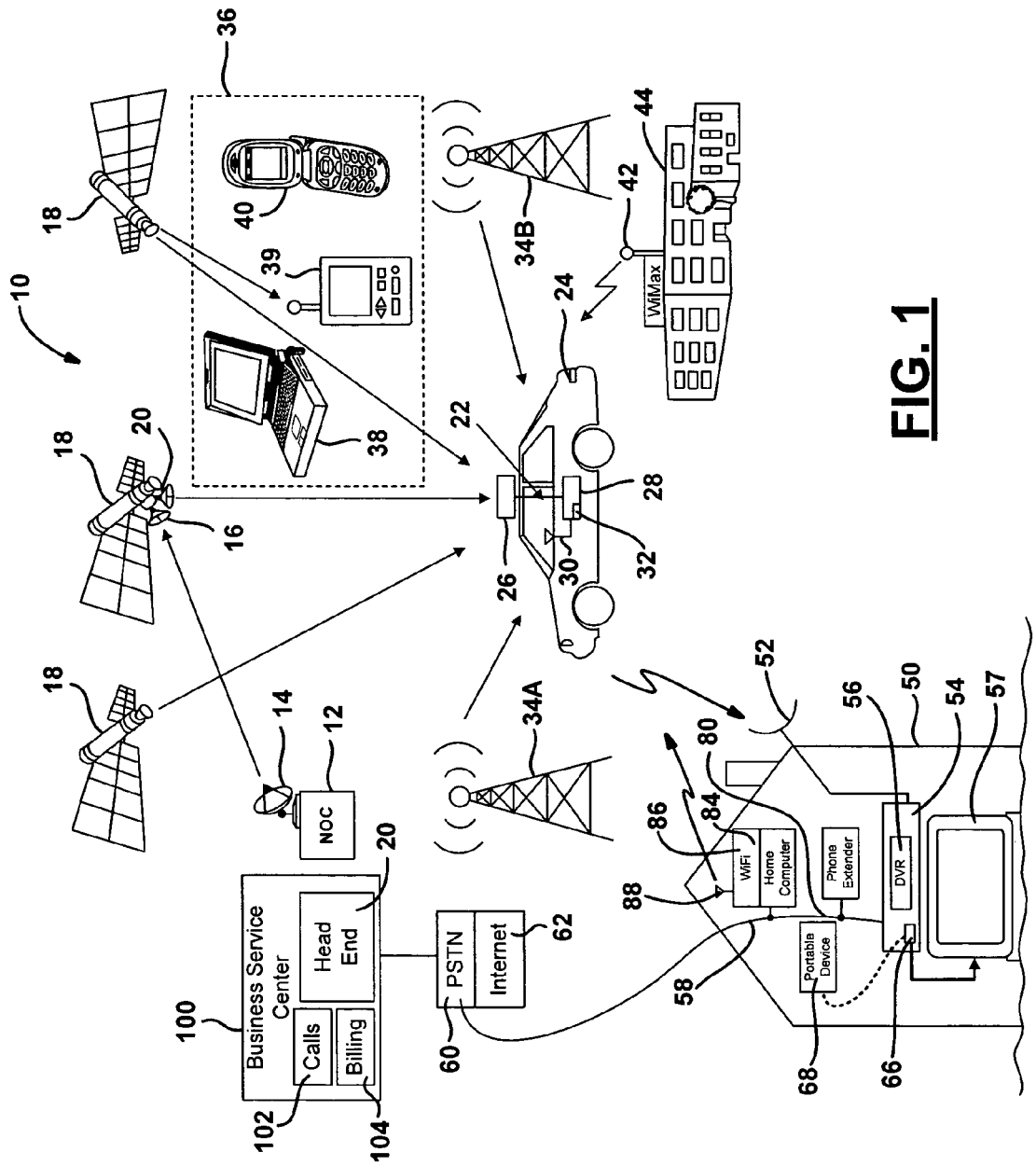
FIG. 1 is a system level view of a satellite broadcasting system according to the present invention.

In the following figures the same reference numerals will be used for the same components. The following figures are described with respect to a mobile satellite television system. However, those skilled in the art will recognize the teachings of the present invention may be applied to various types of mobile reception including land-based type systems. The present invention may be implemented using various types of electronic devices. Thus, the present invention not only relates to mobile satellite television receiving devices, but to non-mobile applications and other electronic devices Referring now to FIG. 1, a satellite television broadcasting system 10 is illustrated. The satellite television broadcasting system 10 includes a network operations center 12 that generates wireless signals through a transmitting antenna 14 which are received by a receiving antenna 16 of a satellite 18. The wireless signals, for example, may be digital. A transmitting antenna 20 generates signals directed to various receiving systems including stationary systems such as those in the home as well as mobile receiving systems 22. The wireless signals may have various types of information associated with them including location information. The wireless signals may also have various video and audio information associated therewith. As illustrated, the mobile receiving system 22 is disposed within an automotive vehicle 24. A mobile receiving antenna 26 receives the wireless signals from the satellite 18 and processes the signals in a mobile receiving device 28. The mobile receiving device 28 may be similar a set top box or an integrated receiver decoder and will be further described below. The mobile receiving device 28 may also include a separate antenna 30 and a receiver 32 for receiving various content from a home-base system as will be described below.

The system may also be used for displaying various wireless information on a personal mobile device 36 such as a laptop computer 38, a personal digital assistant 39, and a cellular telephone 40. It should be noted that these devices and the automotive-based devices may also receive wireless signals having various types of information associated therewith from the cellular towers 34A and 34B. Other types of information may be broadcast from various other types of broadcasting areas such as an antenna 42 on a building 44. The building 44 may be various types of buildings such as a store and the wireless information transmitted from the antenna 42 may be advertising information. WiMax is one example of a suitable protocol. All of the wireless signals preferably include location information transmitted therewith. As will be described below, the information may be coded digitally into the signals. Thus, by reviewing the location information, signals appropriate for the location of the mobile devices may be displayed on the various devices.

A building or home 50 is illustrated having a fixed antenna 52. The fixed antenna 52 is coupled to a receiving device 54. The receiving device 54 may also be referred to as an integrated receiver decoder. The receiving device 54 receives the satellite signals through the antenna 52 and converts them into audio and video files to be played on television monitor 56. The receiving device may include a digital video recorder 56. Often times, the receiving device 54 may be coupled to a telephone line 58 which in turn is coupled to the public service telephone network 60 and which may also be coupled to the Internet 62. The receiving device 54 may also include a transmitter 66 that is used to communicate with a portable device 68. As will be described below, content from the DVR 56 may be transferred through the transmitter 66 to the portable device 68 so that it may be used by the mobile receiving device 28. The transmitter 66 may be an RF infrared, blue tooth, WiFi or WiMax transmitter. It should be noted that the transmitter 66 may be a wireless or wired connection to the portable device 68.

As is mentioned above, the receiving device 54 may be coupled to a phone line 58. This allows another method for file transfer from the receiving device 54 to the receiving device 28. A file may be transferred using a wireless phone extender 80. The wireless phone extender 80 generates over-the-air signals that may be received through the antenna 30 of the receiving device 28.

A home computer 84 may also be coupled to the phone wire 58. In this example, the phone wire may also be a cable wire. By coupling the home computer 84 to the receiving device 54, various actions may be controlled such as a file transfer from the receiving device 54 to the mobile receiving device 28 through a particular protocol or network such as a WiFi network 86. The WiFi network 86 may generate signals through antenna 88. Various frequencies may be used in the WiFi network.

A business service center 100 may be coupled to the public service telephone network (PSTN) 60. The business service center 100 is typically used in a DirecTV-type system for billing of Pay-Per-View and interactive programming. The business center 100 may receive calls 102 and provide billing services 104. The business service center 100 may also act as a head end 106 coupled to network operation center 12. The business service center 100 may allow household keys to be stored on the receiving device 54. A second household key may be provided to the receiving device 28. When content is transferred from the home based receiving device 54 to the mobile receiving device 28, the keys must match to allow playback. Thus, only mobile receivers 28 aligning to the customers of the home-based receiving device 54 are allowed playback of the particular audio and video files.

Figure 2:
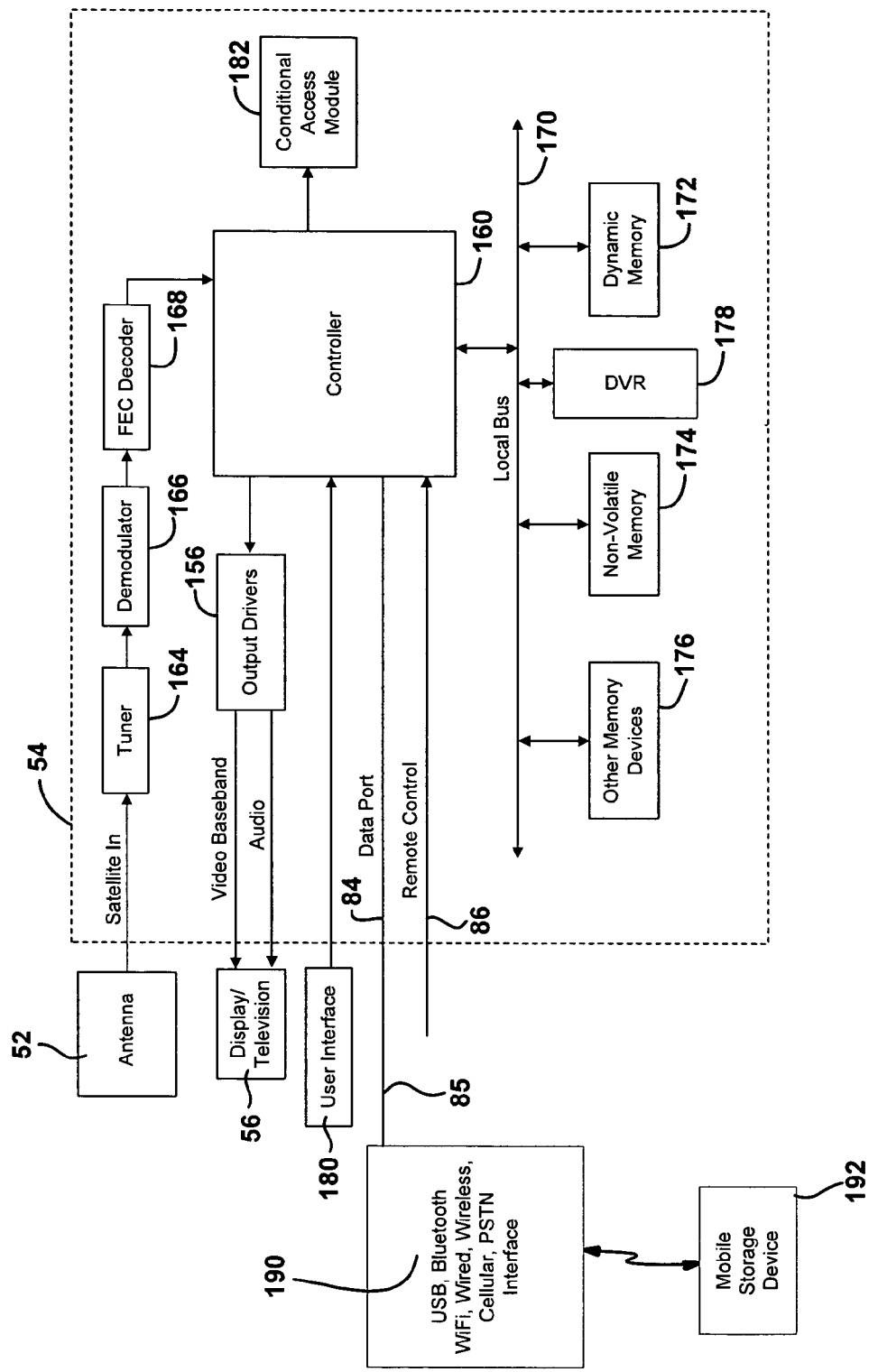
FIG. 2 is a block diagrammatic view of a home-based receiving system according to the present invention.

Referring now to FIG. 2, a receiving device 54 is illustrated in further detail. Although the receiving device 54 is illustrated, or is merely representative of various electronic devices with internal controllers. Antenna 252 may be various types of antennas having various numbers of low noise blocks. The antenna 252 may be a single antenna used for satellite television reception. The antenna 26 may also be an electronic antenna.

A display or television 57 may be coupled to or in communication with the receiving device 54. The display 57 may include output drivers 156 used for generating the desired audio and video outputs suitable for the particular display 57.

A controller 160 may be a general processor such as a microprocessor. The controller 160 may be used to coordinate and control the various functions of the receiving device 54. These functions may include a tuner 164, a demodulator 166, a forward error correction decoder 168 and any buffers and other functions. The tuner 164 receives the signal or data from the individual channel. The demodulator 166 demodulates the signal or data to form a demodulated signal or data. The decoder 168 decodes the demodulated signal to form decoded data or a decoded signal. The controller 160 may be similar to that found in current DirecTV set top boxes which employ a chip-based multifunctional controller.

The controller 160 may include or be coupled to a local bus 170. The local bus 170 may be used to couple a dynamic memory 172 such as RAM which changes often and whose contents may be lost upon the interruption of power or boot up. The bus 170 may also be coupled to a non-volatile memory 174. The non-volatile memory may be an in-circuit programmable type memory. One example of a non-volatile memory is an EEPROM. One specific type of EEPROM is flash memory. Flash memory is suitable since it is sectored into blocks of data segments that may be individually erased and rewritten.

Other memory devices 176 may also be coupled to local bus 170. The other memory devices may include other types of dynamic memory, non-volatile memory, or may include such devices such as a digital video recorder (DVR) 178. The display 56 may be changed under the control of controller 260 in response to the data in the dynamic memory 172 or non-volatile memory 174. The DVR 178 may store various audio and video files to be transferred.

The controller 160 may also be coupled to a user interface 180. User interface 180 may be various types of user interfaces such as a keyboard, push buttons, a touch screen, a voice activated interface, or the like. User interface 180 may be used to select a channel, select various information, change the volume, change the display appearance, or other functions. The user interface 180 is illustrated as part of the mobile receiving device. However, should the unit be incorporated into a vehicle, the user interface 180 may be located external to the mobile receiving device such as dial buttons, voice activated system, or the like incorporated into the vehicle and interface with the mobile receiving device.

A conditional access module card 182 (CAM) may also be incorporated into the mobile receiving device. Access cards such as a conditional access module (CAM) cards are typically found in DirecTV units. The access card 82 may provide conditional access to various channels and wireless signals generated by the system. Not having an access card or not having an up-to-date access card 182 may prevent the user from receiving or displaying various wireless content from the system.

FIG. 2 also shows an interface 190. The interface 190 may be external to the receiver 54 or internal to the receiver 54. The interface 190 may include the functions of the transmitter 66 illustrated in FIG. 1. The interface 190 is used to communicate files stored within the memory of receiver 54 to the mobile receiver 28. This may be done directly through a WiFi, WiMax, wireless, cellular or other communication directly to the mobile receiver 28.

The interface 190 may also be coupled to a mobile storage device 192. The mobile storage device 192 receives files for transfer to the mobile receiving device 28. The mobile storage device 192 may be a simple memory that is coupled to the interface 192 through a USB-type port. Of course, other types of ports may be used to couple a memory thereto. Other types of devices include a portable hard disk drive, a portable chip base system, or the like. The files loaded on to the mobile storage device may include the household key for security.

The interface 190 may also include the function of a wireless phone extender or a cellular phone transmitter.

Figure 3:
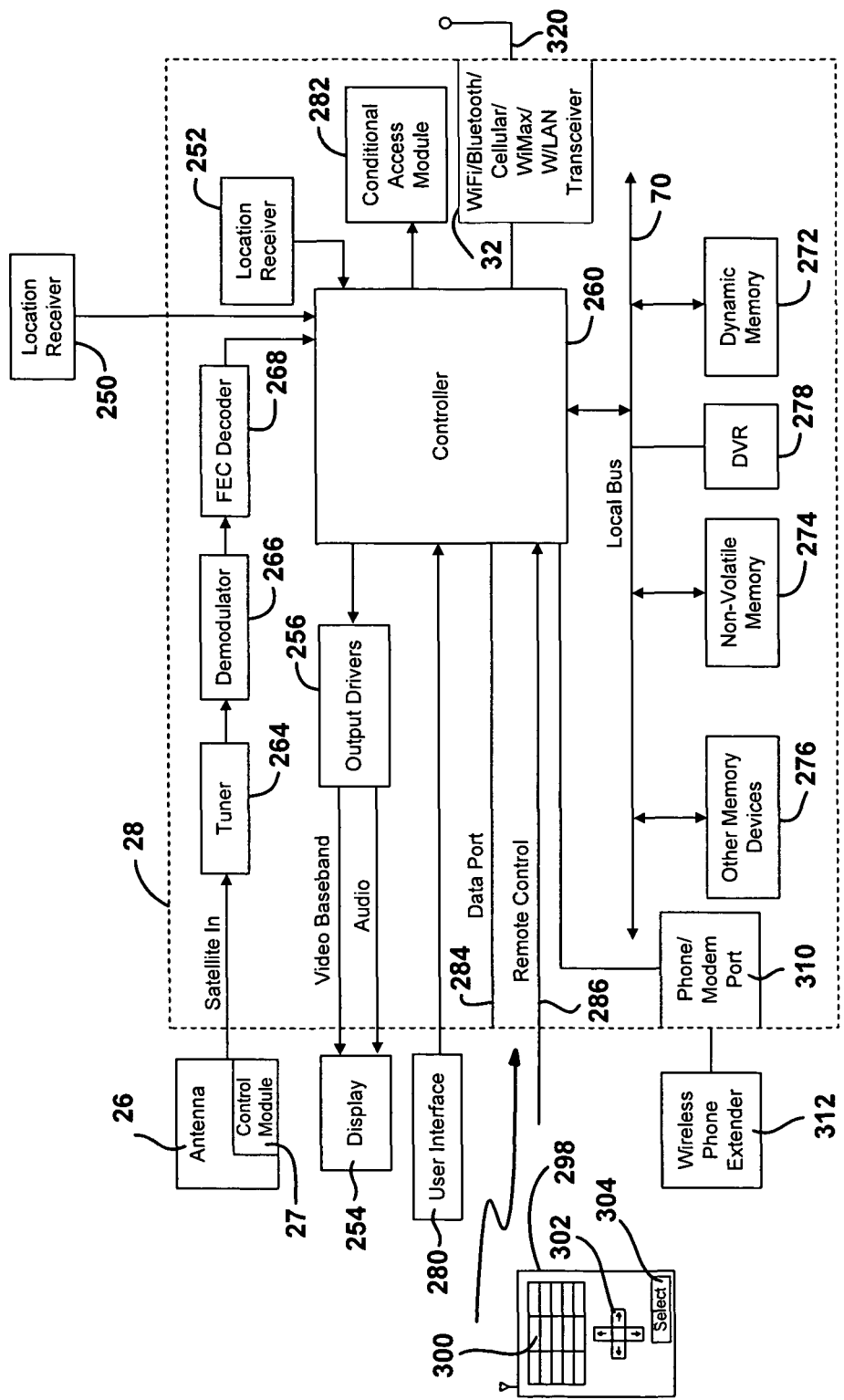
FIG. 3 is a block diagrammatic view of a mobile receiving system according to the present invention.

Referring now to FIG. 3, the receiving device 28 is illustrated in further detail. Although the receiving device 28 is illustrated, or is merely representative of various electronic devices with internal controllers. Antenna 26 may be various types of antennas including a rotating antenna which is used to track the relative movement of the satellite or other transponding device with respect to the vehicle. The antenna 26 may be a single antenna used for satellite television reception, or a number of antennas such as one for receiving television signals and one coupled to a location receiver 250 such as GPS receiver. The antenna 26 may also be an electronic antenna. The antenna 26 may include an internal controller 27 that controls the operation of the antenna 26.

The mobile receiver unit 28 may be coupled to antenna 26 with a two-way communication channel such as a wire or a wireless system. The mobile receiving device 28 may also include a location receiver 252 integrated therein. The location receiver 252 may be a GPS receiver. In a preferred embodiment, only one location receiver 250, 252 may be provided in the system. However, the location receiver 250, 252 may be part of the vehicle 24 or may be part of the mobile receiving system 22, 36. The controller 260 may be coupled directly to location receiver 252 and/or location receiver 250. The mobile receiving device 28 includes a display 254. The display 254 may be incorporated into the device 28 or within the vehicle 24. The display 254 may include output drivers 256 used for generating the desired audio and video outputs suitable for the particular display 254.

A controller 260 may be a general processor such as a microprocessor. The controller 260 may be used to coordinate and control the various functions of the receiving device 28. These functions may include a tuner 264, a demodulator 266, a forward error correction decoder 268 and any buffers and other functions. The tuner 264 receives the signal or data from the individual channel. The demodulator 266 demodulates the signal or data to form a demodulated signal or data. The decoder 268 decodes the demodulated signal to form decoded data or a decoded signal. The controller 260 may be similar to that found in current DirecTV set top boxes that employ a chip-based multifunctional controller.

The controller 260 may include or be coupled to a local bus 270. The local bus 270 may be used to couple a dynamic memory 272 such as RAM that changes often and whose contents may be lost upon the interruption of power or boot up. The bus 270 may also be coupled to a non-volatile memory 274. The non-volatile memory may be an in-circuit programmable type memory. One example of a non-volatile memory is an EEPROM. One specific type of EEPROM is flash memory. Flash memory is suitable since it is sectored into blocks of data segments that may be individually erased and rewritten.

Other memory devices 276 may also be coupled to local bus 270. The other memory devices may include other types of dynamic memory, non-volatile memory, or may include such devices such as a digital video recorder 278. The display 254 may be changed under the control of controller 260 in response to the data in the dynamic memory 272, non-volatile memory 274 or memory 278.

The controller 260 may also be coupled to a user interface 280. User interface 280 may be various types of user interfaces such as a keyboard, push buttons, a touch screen, a voice activated interface, or the like. User interface 280 may be used to select a channel, select various information, change the volume, change the display appearance, or other functions. The user interface 280 is illustrated as part of the mobile receiving device. However, should the unit be incorporated into a vehicle, the user interface 280 may be located external to the mobile receiving device such as dial buttons, voice activated system, or the like incorporated into the vehicle and interface with the mobile receiving device.

One example of a user interface 280 is a remote control device 298 having a key pad 300, an arrow key pad 302, and a select button 304. Inputs to the receiver 28 may be provided by the remote control device 298 or through another type of user interface 280.

A conditional access module card 282 (CAM) may also be incorporated into the mobile receiving device. Access cards such as a conditional access module (CAM) cards are typically found in DirecTV units. The access card 282 may provide conditional access to various channels and wireless signals generated by the system. Not having an access card or not having an up-to-date access card may prevent the user from receiving or displaying various wireless content from the system.

The controller 260 may be coupled to a data port 284 that is used to send or receive data and a remote control input 286 for receiving data from a wired or wireless remote control device.

Controller 260 may be coupled to a wireless or wired modem port 310. The wireless or wired phone/modem port may be coupled to a wireless phone extender 312. The wireless phone extender 312 is used to communicate with the interface 190 in the home based receiver unit 54.

Controller 260 may also be coupled to an interface 32 that may include an antenna 320. The interface 32 may include a WiFi, WiMax, Bluetooth, cellular, WiMax, wireless LAN, or the like. Signals and files received through the interface 232 may be stored on the DVR 278 for eventual playback and display on the display 254.

Figure 4:
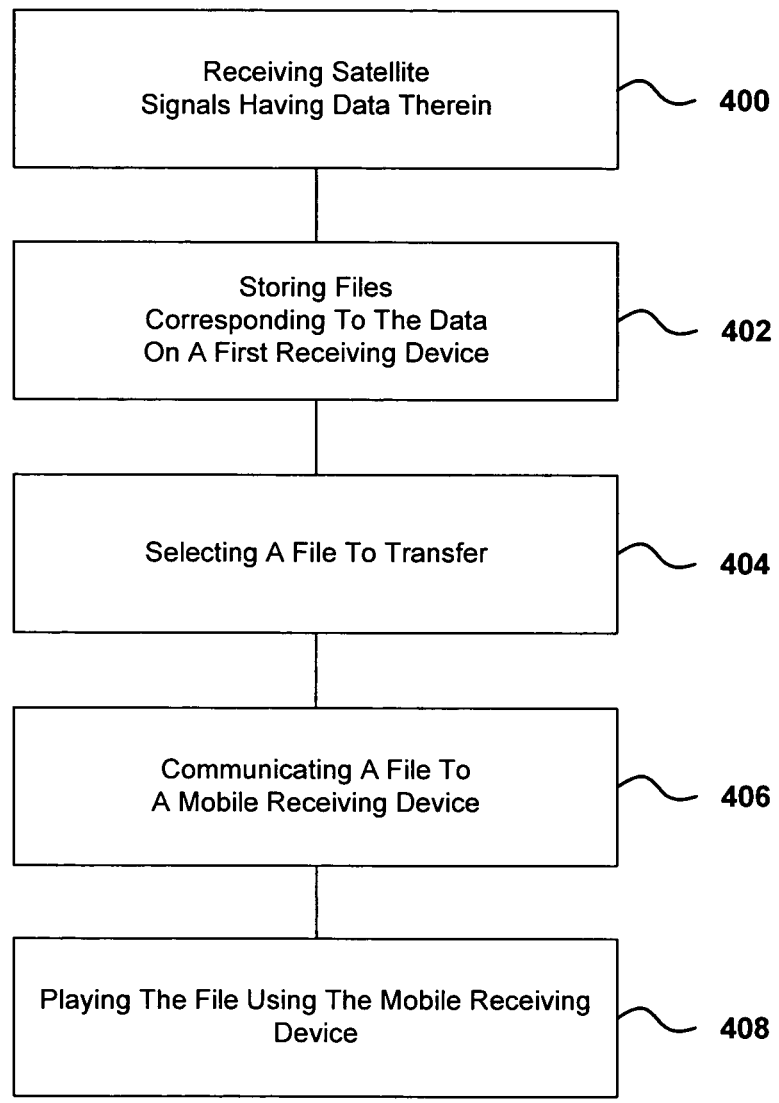
FIG. 4 is a flow chart illustrating one method for operating the present invention.

Referring now to FIG. 4, a method of transferring files between two different receiving devices is set forth. It should be noted that the files may originate from or are provided by the satellite and, therefore, be satellite files. The files may be audio alone, audio and video, video alone, or data signals.

In step 400, satellite signals having data therein is received in a home or stationary receiving device 54. It should also be noted that a portable receiving device may also be used; however, a stationary receiving device is the most likely implementation.

In step 402, files from the satellite signals corresponding to the data are stored on a first receiving device such as a home-based receiving device.

A file may be transferred by selecting from a menu or the like in step 404. The menu may, for example, be an on-screen-type menu listing the various files to transfer. Upon selection by a user interface, the file may be communicated to the mobile receiving device in step 406. The original satellite file may be communicated in a various number of manners including using an intermediate mobile storage device 192 illustrated in FIG. 2. Various types of devices may be used for the transfer including wired and non-wired transfers through an interface. For a mobile storage device 192, a USB connection may be used. Wireless transfer may include a Bluetooth, WiFi, WiMax, wired, wireless, cellular phone or wireless phone. Of course, the wireless methods for transferring may include wirelessly transferring files to the mobile storage device 192.

Communicating the file in step 406 may also include storing the file in a memory in the mobile receiving device. Although the file may be played back directly from the mobile storage device 192, it is more likely that the file is transferred to a memory device such as the DVR 278 of FIG. 3.

In step 408, the file is played back using the mobile receiving device. Playback may include using a display such as a television or an audio system in a vehicle. In step 408, playing the file may also include comparing authorizations or a household key to the stored household key. Thus, playback may be disabled if the household key in the file does not match the household key on the second playback device.

While particular embodiments of the invention have been shown and described, numerous variations and alternate embodiments will occur to those skilled in the art. Accordingly, it is intended that the invention be limited only in terms of the appended claims.

What is claimed is:

1. A method comprising:
storing a file on a storage device associated with a satellite receiver;
storing a first household key with the file;
communicating the file and the first household key to a file playback device from the storage device;
storing a second household key on the file playback device;
comparing the first household key and the second household key in the file playback device;
authorizing playback of the file through the file playback device when the first household key matches the second household key during comparing; and
playing the file with the file playback device after authorizing.

2. A method as in claim 1 wherein communicating comprises wirelessly communicating the file.

3. A method as in claim 2 wherein wirelessly communicating the file comprises communicating the file through a wireless network.

4. A method as in claim 2 wherein wirelessly communicating the file comprises communicating the file through a WiFi network.

5. A method as in claim 2 wherein wirelessly communicating the file comprises communicating the file through an extender of a wireless phone network.

6. A method as in claim 2 wherein wirelessly communicating the file comprises communicating the file through a cellular phone network.

7. A method as in claim 1 wherein communicating comprises storing the file on a portable memory device and further comprising coupling the portable memory device to the mobile playback device.

8. A method as in claim 7 wherein playing the file comprises playing the file from the portable memory device.

9. A method as in claim 1 wherein the file playback device comprises a mobile integrated receiver decoder.

10. A method as in claim 1 wherein the storage device comprises a DVR and wherein communicating the file comprises transferring the file from the storage device to the DVR.

11. A method as in claim 10 wherein transferring the file comprises transferring the file to a portable memory device and transferring the file from the portable memory device to the DVR.

12. A method comprising:
storing a file on a storage device in communication with a satellite receiver;
storing a first household key with the file;
transferring the file and the first household key to a portable memory device;
storing a second household key on a playback device;
coupling the portable memory device to the playback device;
transferring the file to the playback device from the portable memory device;
comparing the first household key and the second household key in the playback device;
authorizing playback of the file through the playback device when the first household key matches the second household key during comparing; and
playing the file with the playback device after authorizing.

13. A method as in claim 12 wherein transferring the file to the playback device comprises transferring the file to a DVR in the playback device.

14. A method as in claim 12 wherein transferring the file to the playback device comprises transferring the file to a memory in the playback device.

15. A method as in claim 12 wherein the playback device is a mobile playback device.

16. A method as in claim 12 wherein the playback device is an automotive mobile satellite receiving device.

17. A method of using a video file stored in a home-based storage device comprising:
wirelessly communicating the video file and a first household key to an automobile-based satellite receiving device fixedly coupled within an automobile from the home-based storage device;
storing the video file in the automobile-based satellite receiving device; and
playing the video file with the automobile-based satellite receiving device when the first household key matches a second household key stored in the automobile-based satellite receiving device.

18. A method as in claim 17 wherein storing the video file in the automobile-based satellite receiving device comprises storing the video file in a DVR in the automobile-based receiving device.

19. A method as in claim 17 wherein storing the video file in the automobile-based satellite receiving device comprises storing the video file to a memory in the playback device.

20. A system comprising:
a fixed satellite receiver having a storage device associated therewith, said receiver storing a satellite file and a first household key therein and communicating the satellite file and the first household key from the storage device; and
a mobile satellite receiver storing a second household key and receiving the satellite file and the first household key, and said mobile satellite receiver comparing the first household key and the second household key in the playback device, and playing the satellite file when the first household key corresponds to the second household key during comparing.

21. A system as in claim 20 wherein the storage device comprises a DVR.

22. A system as recited in claim 20 further comprising a portable memory device receiving and storing the satellite file, said portable memory device communicating the satellite file to the mobile satellite receiver.

* * * * *